J. H. REED.
PIN.
APPLICATION FILED JULY 7, 1909.
958,311. Patented May 17, 1910.
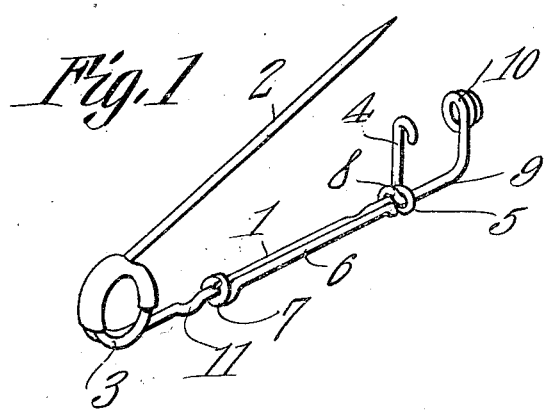
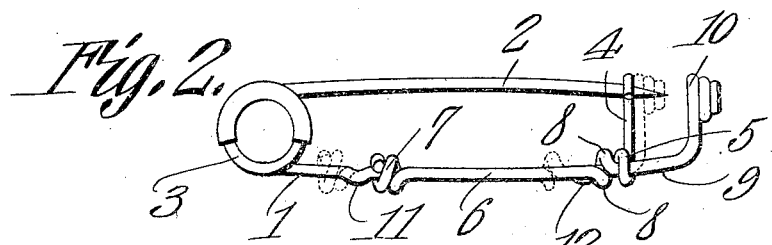
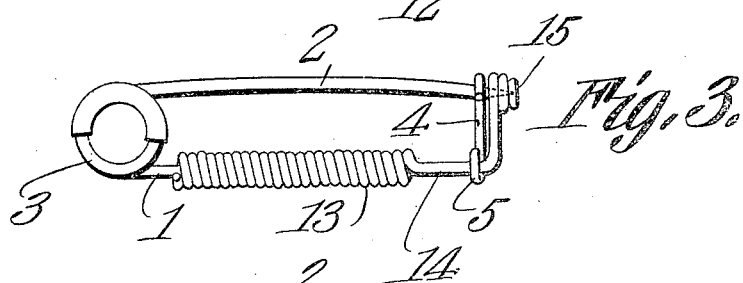
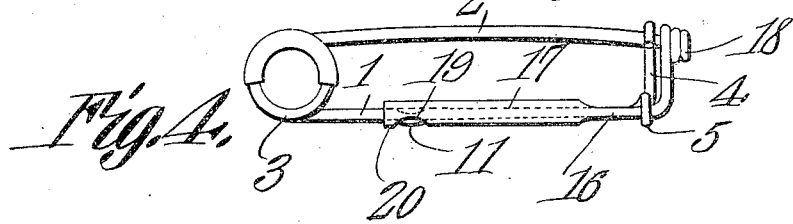
Witnesses
Francis Boyle
Inventor
John H. Reed.
By
Attorneys

UNITED STATES PATENT OFFICE.

JOHN H. REED, OF LANCASTER, WISCONSIN.

PIN.

958,311.

Specification of Letters Patent.

Patented May 17, 1910.

Application filed July 7, 1909. Serial No. 506,355.

*To all whom it may concern:*

Be it known that I, JOHN H. REED, a citizen of the United States, residing at Lancaster, in the county of Grant and State of Wisconsin, have invented a new and useful Pin, of which the following is a specification.

My invention relates to pins, particularly to safety pins, and has for an object to provide a device of this character which will have a movable guard to incase the point of the pin.

Another object is to provide a device of this character having a guard for the point of the pin which will be yieldingly held in its operative position when so adjusted.

A further object is to provide a device of this character in which the upstanding cap forming the guard for the point of the pin will be held in the same relative position to the catch of the pin at all times.

With the above advantages and other objects in view which will appear as the nature of the invention is better understood, my invention comprises the novel details of construction and combination of parts illustrated in the accompanying drawing, shown in the following specification, and set forth in the appended claims.

In the accompanying drawing, Figure 1 is a perspective view of the safety pin constructed in accordance with my invention in open position. Fig. 2 is a side elevation of my improved safety pin with the pin in closed position and the guard cap shown in position for engagement with the point of the pin. Fig. 3 is a modification of the safety pin. Fig. 4 is a further modification of the same.

In a more detailed description of my invention in which like characters of reference designate similar parts in the views shown, 1 designates the shank of the safety pin, and 2 the pin, the shank and pin being connected together at one end by a coil 3 in the usual and well known manner.

Disposed on the free end of the shank is an upstanding hook or catch 4 for engagement with the pin adjacent its pointed end.
The catch is preferably formed integral with the shank of the pin and is provided at its lower end with a loop or eye 5 which loosely engages the shank of the movable guard member. The guard member embodies a shank portion 6 adapted to extend along and be held parallel with the shank of the pin and terminates at one end in an eye 7 that loosely engages the shank of the safety pin, and at the other end in a single eye 8 which loosely engages the shank of the safety pin adjacent the base eye 5 of the catch. The outer eye 8 of the guard member performs the function of a stop for contact with the base eye of the catch whereby to limit the outward movement of the guard member. The shank of the guard member is extended, as shown at 9, and terminates in a cap 10 which is adapted to surround or incase the point of the pin when in closed position. The shank of the safety pin is depressed on its upper surface to provide crimps 11 and 12 on its lower surface which are so spaced apart that the guard member eyes 7 and 8 may spring over and engage one side of the crimps when the cap is in engagement with the pin point. The guard member is thus yieldingly held in this position until the eyes of its shank are forced back over the crimps carried by the shank of the safety pin when the guard member will be moved forward and the cap disengaged from the point of the pin. It is evident that by these crimps, any rotary or turning movement of the guard member upon the shank of the safety pin is prevented so that the guard cap will be held in the same relative position to the hook or catch of the safety pin at all times.

In Fig. 3 is shown a modification of the guard member of the safety pin. In this case the guard member is provided with a spiral bearing 13 which slidingly fits the shank of the safety pin, the terminal loop of the spiral bearing performing the function of a stop for contact with the base eye 5 of the safety pin catch whereby to limit the outward movement of the guard member. The shank 14 of the guard member is loosely engaged through the base eye of the catch 4 and terminates in an upstanding cap 15 engageable with the point of the pin when in its closed or operative position.

A further modification of my device is shown in Fig. 4 in which the shank 16 of the guard member terminates at one end in a tubular shell 17 adapted to slidingly fit the shank of the safety pin, and at the other end in an upstanding cap 18 for engagement with the pin point. In order to yieldingly hold the guard member in its operative position an opening 19 is formed in the under surface of the tubular shell 17 adjacent its rear end adapted to engage the crimp 11 disposed on the under surface of the shank of the safety pin, as above described.

It is evident that the end portion 20 of the tube may be forced over the crimp toward the catch of the safety pin whereby to remove the catch from engagement with the pin point, and that when the cap is moved to engagement with the pin point the crimp carried by the shank of the safety pin will spring into the opening in the tubular shell and yieldingly hold the parts locked in this position.

From the foregoing description, taken in connection with the accompanying drawing, it is thought that the construction and operation of my invention will be easily understood without a more extended explanation, it being understood that various changes in the form, proportion and minor details of construction may be made without sacrificing any of the advantages or departing from the spirit of the invention.

What is claimed is:

1. A safety pin having a shank provided with a crimp adjacent each end, a catch for the point of said pin extending from said shank adjacent one of said crimps, and a guard for the point of the pin having a shank portion extending longitudinally of said pin shank and provided with a pair of spaced eyes to spring over said crimps and yieldingly hold the guard in open or closed position.

2. A safety pin provided on its shank with a pair of spaced crimps, a catch adjacent one of said crimps, and a guard for the point of the pin having a shank provided with a pair of spaced eyes to spring over said crimps and lock the guard in open or closed position, and having a cap arranged at one end of the said guard shank and held in alinement with said catch to engage the point of said pin.

3. In a safety pin having a shank and a catch, a guard for the point of said pin embodying a shank portion slidingly fitting the shank of said safety pin and a cap normally held in alinement with said catch, and a stop disposed on the shank of said safety pin engageable with the shank portion of said guard whereby to yieldingly hold said cap in engagement with the point of said pin.

In testimony that I claim the foregoing as my own, I have hereunto affixed my signature in the presence of two witnesses

JOHN H. REED.

Witnesses:
C. A. CRITCHLOW,
S. H. TAYLOR.